United States Patent
Treadway

(10) Patent No.: US 11,112,073 B2
(45) Date of Patent: Sep. 7, 2021

(54) SOLID STATE LIGHT ASSEMBLY FOR FLUSH MOUNTED LIGHTING FIXTURES

(71) Applicant: MAXLITE, INC., West Caldwell, NJ (US)

(72) Inventor: Patrick Treadway, Rancho Cucamonga, CA (US)

(73) Assignee: MAXLITE, INC., West Caldwell, NJ (US)

( * ) Notice: Subject to any disclaimer, the term of this patent is extended or adjusted under 35 U.S.C. 154(b) by 0 days.

(21) Appl. No.: 16/914,983

(22) Filed: Jun. 29, 2020

(65) Prior Publication Data

US 2020/0326046 A1   Oct. 15, 2020

Related U.S. Application Data

(63) Continuation of application No. 15/389,523, filed on Dec. 23, 2016, now Pat. No. 10,724,694.

(60) Provisional application No. 62/273,025, filed on Dec. 30, 2015, provisional application No. 62/287,144, filed on Jan. 26, 2016.

(51) Int. Cl.
| | |
|---|---|
| *F21S 8/04* | (2006.01) |
| *F21V 3/06* | (2018.01) |
| *F21V 13/04* | (2006.01) |
| *F21V 29/70* | (2015.01) |
| *F21K 9/66* | (2016.01) |
| *F21K 9/20* | (2016.01) |
| *F21V 15/00* | (2015.01) |
| *F21V 17/10* | (2006.01) |
| *F21V 23/00* | (2015.01) |
| *F21V 29/89* | (2015.01) |
| *F21Y 115/10* | (2016.01) |
| *F21Y 115/15* | (2016.01) |

(52) U.S. Cl.
CPC .................. *F21S 8/04* (2013.01); *F21K 9/20* (2016.08); *F21K 9/66* (2016.08); *F21V 3/061* (2018.02); *F21V 13/04* (2013.01); *F21V 15/00* (2013.01); *F21V 17/101* (2013.01); *F21V 23/005* (2013.01); *F21V 29/70* (2015.01); *F21V 29/89* (2015.01); *F21Y 2115/10* (2016.08); *F21Y 2115/15* (2016.08)

(58) Field of Classification Search
CPC .......... F21S 8/04; F21V 3/0418; F21V 3/061; F21V 13/04; F21V 15/00; F21V 17/101; F21V 23/005; F21V 29/70; F21V 29/89; F21K 9/20; F21K 9/66; F21Y 2105/18; F21Y 2115/10; F21Y 2115/15
See application file for complete search history.

(56) References Cited

U.S. PATENT DOCUMENTS

| | | |
|---|---|---|
| 2,568,893 A | 9/1951 | Josef |
| 4,697,950 A | 10/1987 | Copeland |
| 4,954,936 A * | 9/1990 | Kawabata ............ B60Q 1/2657 362/249.01 |
| 9,453,635 B1 | 9/2016 | Fuller et al. |
| 9,622,314 B1 | 4/2017 | Li |
| 2011/0193463 A1 | 8/2011 | Daniel |
| 2012/0170255 A1 | 7/2012 | McMillan |
| 2013/0027929 A1 | 1/2013 | McMillan |
| 2014/0078723 A1 | 3/2014 | Chen et al. |

(Continued)

*Primary Examiner* — Zheng Song
(74) *Attorney, Agent, or Firm* — Budzyn IP Law, LLC

(57) ABSTRACT

An assembly is provided herein for a lighting fixture and for retrofitting a flush mounted light fixture to be provided with solid state lighting.

28 Claims, 3 Drawing Sheets

(56) References Cited

U.S. PATENT DOCUMENTS

2017/0097148 A1    4/2017  Burns et al.
2017/0277030 A1    9/2017  McMillan et al.

* cited by examiner

SOLID STATE LIGHT ASSEMBLY FOR FLUSH MOUNTED LIGHTING FIXTURES

CROSS-REFERENCES TO RELATED APPLICATIONS

This application is a continuation of U.S. patent application Ser. No. 15/389,523, filed Dec. 23, 2016, now allowed, which claims priority to U.S. Provisional Patent Application No. 62/273,025 filed Dec. 30, 2015, and, to U.S. Provisional Patent Application No. 62/287,144, filed Jan. 26, 2016, the contents of which are incorporated by reference herein.

BACKGROUND OF THE INVENTION

Flush mounted lighting fixtures, which are typically ceiling mounted, are well known in the prior art. These lighting fixtures are typically provided with E26 sockets, or the like, for incandescent bulbs, or GU24 sockets, or the like, for compact fluorescent bulbs.

Solid state lighting, such as provided by light emitting diodes (LED's), organic light emitting diodes (OLED's), or polymer light emitting diodes (PLED's), has been found to be more energy efficient than incandescent or fluorescent lighting. Thus, there has been a movement to utilize solid state lighting over incandescent or fluorescent lighting. Light fixtures configured for incandescent or fluorescent lighting must be retrofitted to accommodate solid state lighting, if there is a desire to retain the light fixtures for use with solid state lighting.

SUMMARY OF THE INVENTION

An assembly is provided herein for a lighting fixture and for retrofitting a flush mounted light fixture to be provided with solid state lighting.

DETAILED DESCRIPTION OF THE INVENTION

Figure 1:
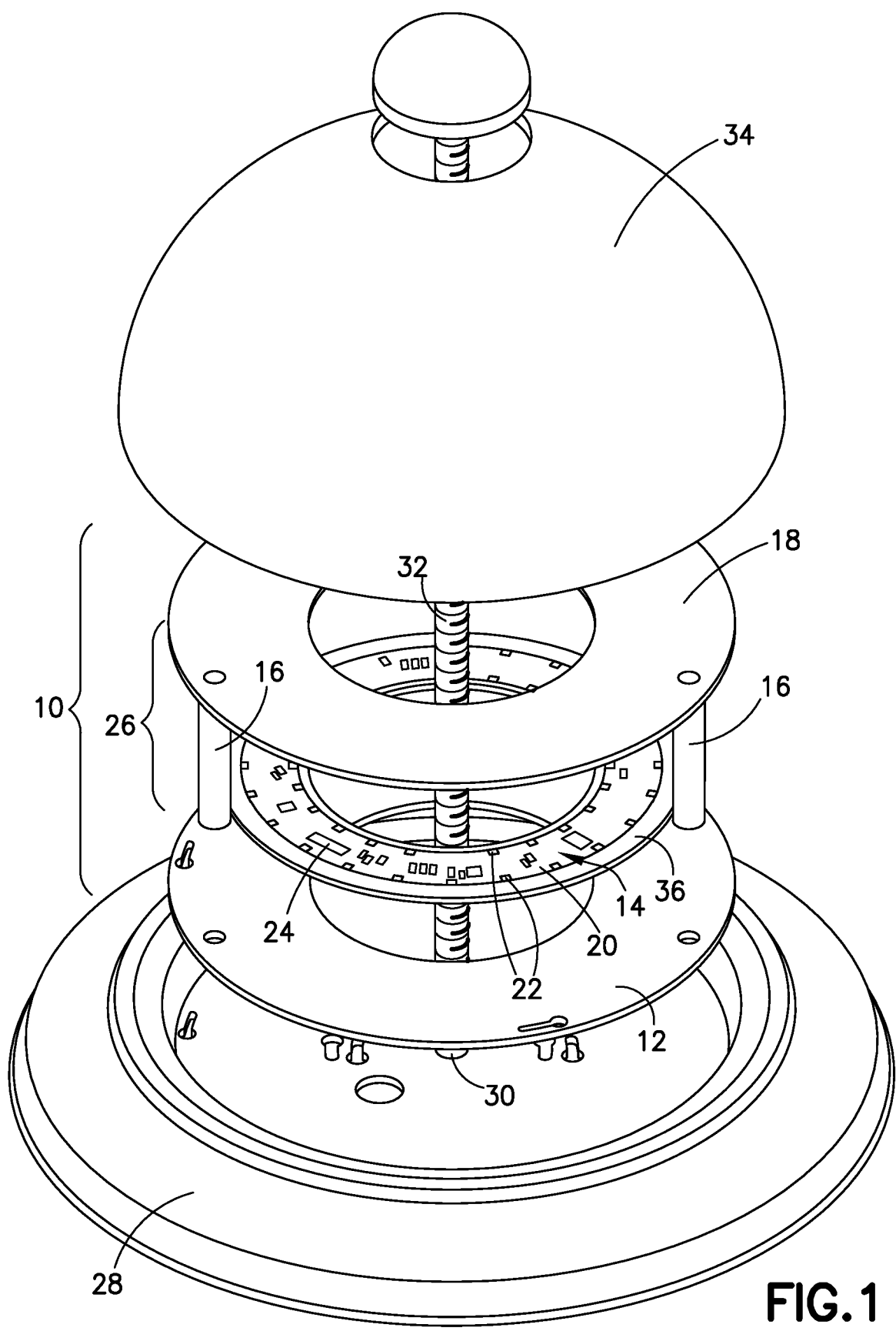
FIG. 1 is an exploded view of a lighting fixture in accordance with the subject invention.
Figure 2:
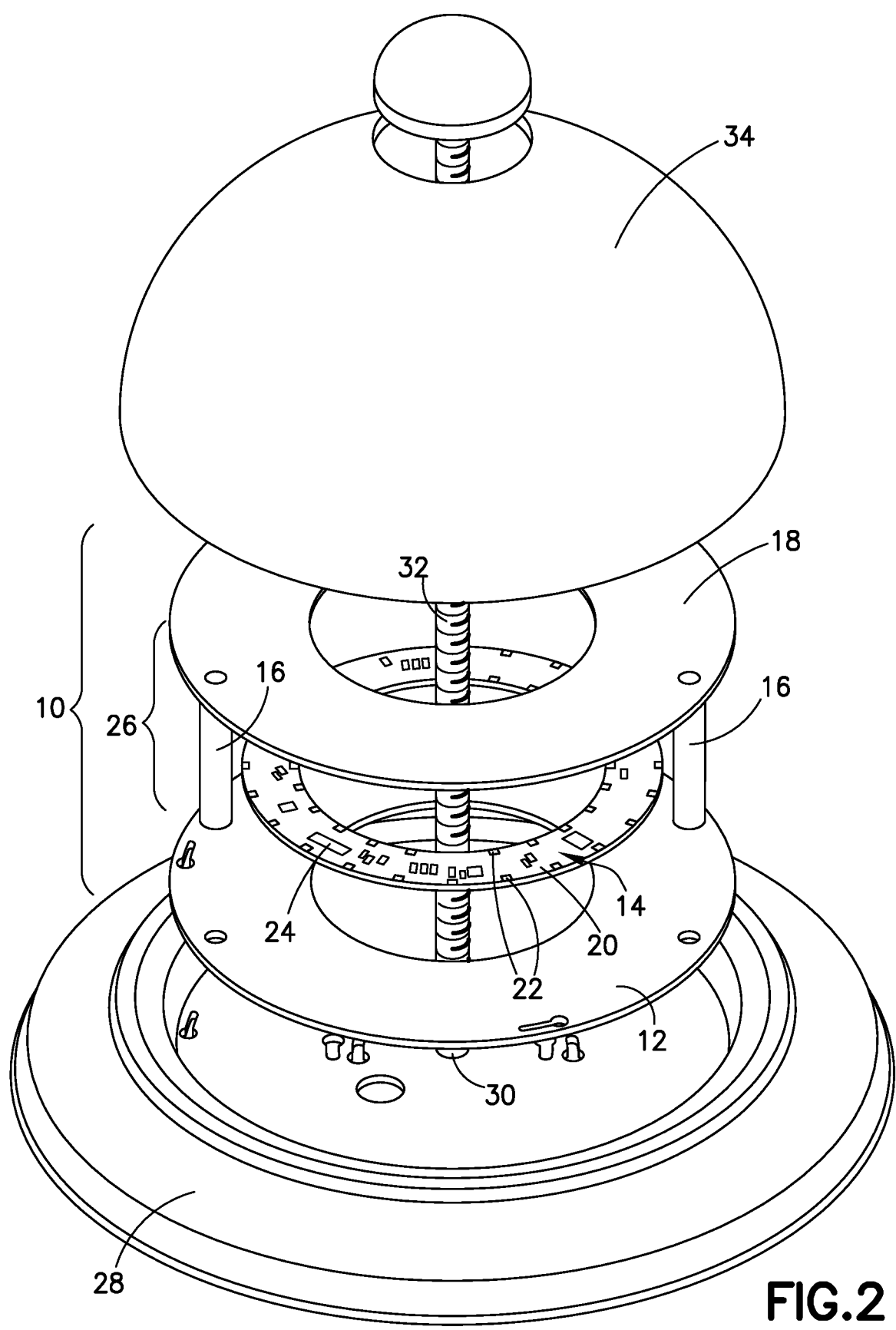
FIG. 2 is an exploded view of a lighting fixture in accordance with the subject invention.
Figure 3:
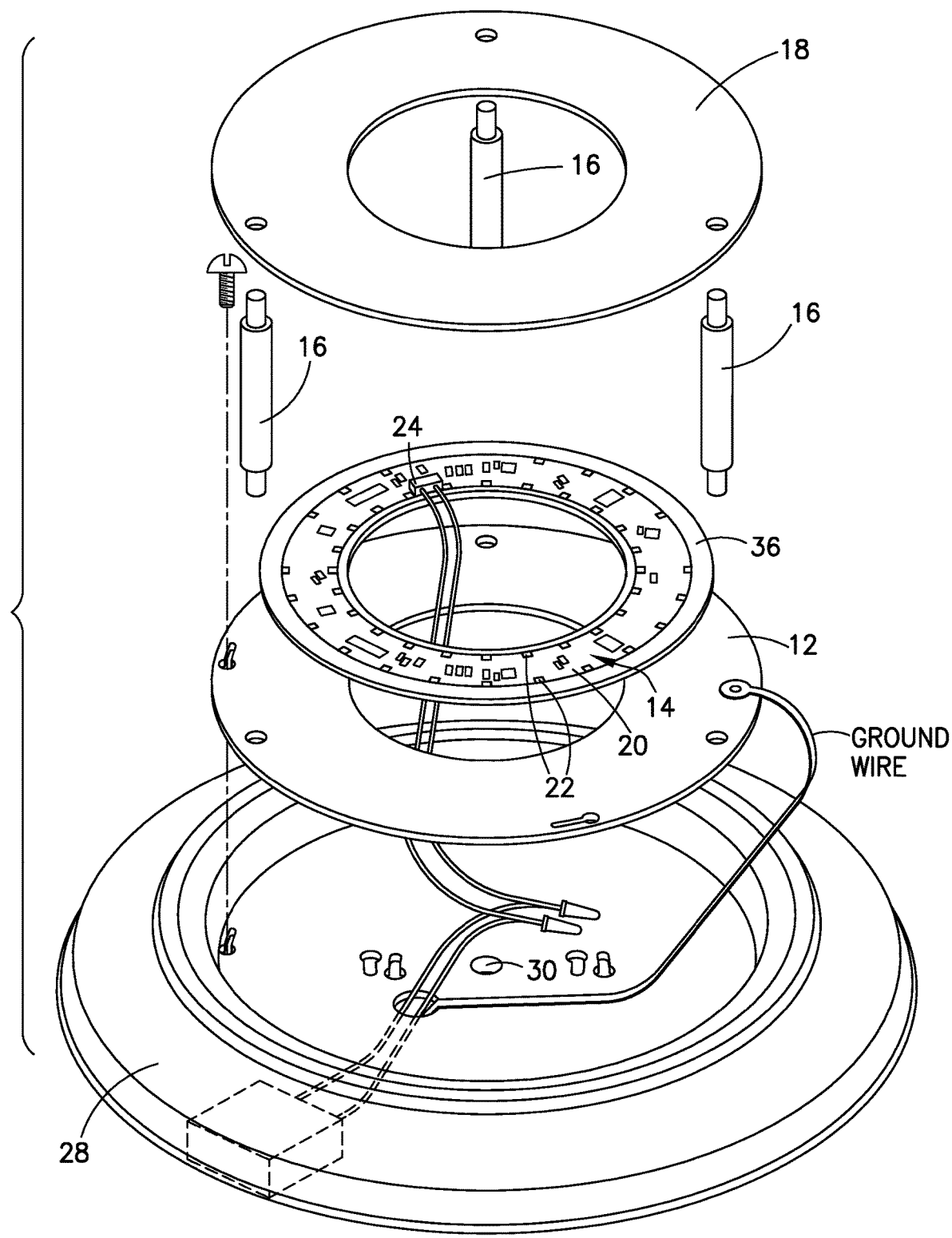
FIG. 3 is an exploded view of an assembly in accordance with the subject invention.

With reference to the attached Figures, an assembly 10 may be provided which includes a carrier 12, a lighting unit 14, stand offs 16 and a protective barrier 18. Preferably, the carrier 12 is formed of metal, such as sheet metal or aluminum, and is sized to accommodate the lighting unit 14. The carrier 12 preferably has thermal conductive properties to dissipate heat generated by the lighting unit 14. The lighting unit 14 preferably includes a printed circuit board 20 to which one or more light elements 22, which may be in the form of light generating diodes, such as LED's, OLED's, and/or PLED's, are electronically coupled to a driver 24. The driver 24 is configured to convert incoming alternating current power to direct current power for the light elements 22. Additional features may be included with the lighting unit 14, including a dimmer, detection sensors (e.g., motion detection) and/or a bluetooth or other wireless receiver for receiving control commands from a remote source. The lighting unit 14 may be mounted or affixed to the carrier 12 in any known manner.

The stand offs 16 are mounted or affixed, on one hand, to the lighting unit 14 and/or the carrier 12, and, on the other hand, to the barrier 18, preferably defining a space 26 therebetween. It is preferred that the stand offs 16 be mounted permanently to the lighting unit 14 and the barrier 18, such as by gluing, fusing, riveting and the like, so that the barrier 18 may be only removed from the stand offs 16 through destructive means. The stand offs 16 may be of various materials which are stable in relatively warm environments, including being of polymeric material(s), e.g., nylon, and/or metal.

The barrier 18 may be of glass or other materials (e.g., polymeric materials) which satisfy UL 94 5VA flammability rating. It is also preferred that the barrier 18 be sufficiently light transmissive to permit light generated by the lighting unit 14 to pass therethrough. The barrier 18 is sized and shaped to limit contact with the lighting unit 14, particularly where high voltage sources, the light elements 22 and other components are mounted, by a user. Preferably, the barrier has an outer footprint at least as great as the light elements 22 of the lighting unit 14—i.e., the outer footprint of the barrier 18 causes the barrier 18 to at least overlap completely the area of the light elements 22 of the lighting unit 14. The barrier 18 preferably overlaps the lighting unit 14 at a minimum and may be formed with a greater footprint from the lighting unit 14.

The assembly 10 is preferably provided as a pre-assembled kit which is ready for mounting. The assembly 10 may be formed in different shapes, including being annular to allow for mounting into a round flush mounted light fixture pan 28 with a center space 30 permitting mounting hardware 32 for a corresponding diffuser 34. Other shapes are possible.

Optionally, a thermal pad or other conductive barrier (e.g., a layer of grease) 36 (FIG. 1) may be provided with the assembly 10, for example between the lighting unit 14 and the carrier 12. The thermal pad or conductive barrier 36 further acts to conduct heat form the lighting unit 14 to the carrier 12.

It is possible to provide the assembly 10 in pre-assembled sub-elements, such as the barrier 18, the stand offs 16 and the lighting element 14 being provided unitarily with separate assembly of the carrier 12 and the thermal pad or other conductive barrier 36 if provided.

For retrofit, an existing socket or sockets is removed from the pan 28 or other base element of an existing light fixture such as a flush mounted light fixture (which may be ceiling mounted). The assembly 10 described herein may be secured to the pan 28 or base element using screws or other known fasteners. The power supply wires which were used to provide standard alternating current power (e.g., 110/120 VAC or 220/240 VAC) to the socket(s), and are now disconnected, are connected to the driver 24 to provide power thereto. The carrier 12 may be ground to the base or pan 28 as well if necessary. The power supply wires may be pulled through an opening of the assembly 10 for possible easier connection to the driver 24. With the alternating current power supply electrically coupled to the driver 24, the lighting unit 14 is fully powered to provide light.

As an alternative, the assembly 10 of the lighting unit 14, the stand offs 16 and the barrier 18 may be provided with a flush mounted light fixture, sold as a new product. Here, the assembly 10 is provided as the light source with no retrofitting required. The carrier 12 and/or the thermal pad or other-conductive barrier 36 may be optionally utilized.

What is claimed is:

1. A lighting fixture comprising:
   a lighting unit including a plurality of light generating diodes, a driver configured to convert incoming alternating current power to direct current power for said plurality of light generating diodes, and a printed circuit board, wherein said plurality of light generating diodes and said driver are located on said printed circuit board;
   a barrier sized and shaped to limit contact with said lighting unit, wherein said barrier is sufficiently light transmissive to permit light generated by said lighting unit to pass therethrough, and, wherein said barrier is spaced from said lighting unit so as to have no direct contact therewith; and,
   a plurality of stand offs mountingly supporting said barrier relative to said lighting unit in a spaced-apart relationship, wherein said printed circuit board of said lighting unit is wholly located: (i) within a perimeter defined by said stand offs and (ii) along a length of said stand offs.

2. The lighting fixture of claim 1, further comprising a carrier.

3. The lighting fixture of claim 2, further comprising a thermal pad located between said lighting unit and said carrier.

4. The lighting fixture of claim 3, wherein said lighting unit is fixed to said carrier.

5. The lighting fixture of claim 2, further comprising a thermal barrier located between said lighting unit and said carrier, said thermal barrier configured to conduct heat from said lighting unit to said carrier.

6. The lighting fixture of claim 5, wherein said lighting unit is fixed to said carrier.

7. The lighting fixture of claim 2, wherein said carrier is metallic.

8. The lighting fixture of claim 2, wherein said stand offs are fixed to said barrier and to said carrier.

9. The lighting fixture of claim 1, wherein said barrier includes a central opening to allow passage therethrough of mounting hardware for the lighting fixture.

10. The lighting fixture of claim 9, wherein said lighting unit defines a lighting unit opening with said plurality of light generating diodes located about said lighting unit opening, wherein said lighting unit opening is aligned with said central opening of said barrier.

11. The lighting fixture of claim 1, wherein said barrier is made of glass.

12. The lighting fixture of claim 1, wherein said barrier is made of a material which satisfies UL 94 5VA flammability rating.

13. The lighting fixture of claim 1, wherein said stand offs are fixed to said barrier and said lighting unit.

14. The lighting fixture of claim 1, wherein said barrier at least overlaps the light generating diodes.

15. A retrofit assembly for flush mounted light fixtures, the assembly comprising:
    a lighting unit including a plurality of light generating diodes, a driver configured to convert incoming alternating current power to direct current power for said plurality of light generating diodes, and a printed circuit board, wherein said plurality of light generating diodes and said driver are located on said printed circuit board;
    a barrier sized and shaped to limit contact with said lighting unit, wherein said barrier is sufficiently light transmissive to permit light generated by said lighting unit to pass therethrough, and, wherein said barrier is spaced from said lighting unit so as to have no direct contact therewith; and,
    a plurality of stand offs mountingly supporting said barrier relative to said lighting unit in a spaced-apart relationship, wherein said printed circuit board of said lighting unit is wholly located: (i) within a perimeter defined by said stand offs and (ii) along a length of said stand offs.

16. The lighting fixture of claim 15, further comprising a carrier.

17. The lighting fixture of claim 16, further comprising a thermal pad located between said lighting unit and said carrier.

18. The lighting fixture of claim 17, wherein said lighting unit is fixed to said carrier.

19. The lighting fixture of claim 16, further comprising a thermal barrier located between said lighting unit and said carrier, said thermal barrier configured to conduct heat from said lighting unit to said carrier.

20. The lighting fixture of claim 19, wherein said lighting unit is fixed to said carrier.

21. The lighting fixture of claim 16, wherein said carrier is metallic.

22. The lighting fixture of claim 16, wherein said stand offs are fixed to said barrier and to said carrier.

23. The lighting fixture of claim 15, wherein said barrier includes a central opening to allow passage therethrough of mounting hardware for the lighting fixture.

24. The lighting fixture of claim 23, wherein said lighting unit defines a lighting unit opening with said plurality of light generating diodes located about said lighting unit opening, wherein said lighting unit opening is aligned with said central opening of said barrier.

25. The lighting fixture of claim 15, wherein said barrier is made of glass.

26. The lighting fixture of claim 15, wherein said barrier is made of a material which satisfies UL 94 5VA flammability rating.

27. The lighting fixture of claim 15, wherein said stand offs are fixed to said barrier and said lighting unit.

28. The lighting fixture of claim 15, wherein said barrier at least overlaps the light generating diodes.

* * * * *